United States Patent
Bykovnikov (10) Patent No.: US 7,613,242 B2
(45) Date of Patent: Nov. 3, 2009

(54) METHOD AND SYSTEM FOR MULTICARRIER COMMUNICATION BETWEEN A BASE STATION AND SUBSCRIBERS OF DIFFERENT BANDWIDTHS

(75) Inventor: Vladimir Bykovnikov, Novgorod (RU)

(73) Assignee: Intel Corporation, Santa Clara, CA (US)

(*) Notice: Subject to any disclaimer, the term of this patent is extended or adjusted under 35 U.S.C. 154(b) by 652 days.

(21) Appl. No.: 10/572,125

(22) PCT Filed: Jun. 23, 2005

(86) PCT No.: PCT/RU2005/000343

§ 371 (c)(1),
(2), (4) Date: Mar. 14, 2006

(87) PCT Pub. No.: WO2006/062436

PCT Pub. Date: Jun. 15, 2006

(65) Prior Publication Data

US 2008/0304581 A1 Dec. 11, 2008

(30) Foreign Application Priority Data

Nov. 29, 2004 (WO) .............. PCT/RU2004/000481

(51) Int. Cl.
H04K 1/10 (2006.01)
(52) U.S. Cl. .................................................. 375/260
(58) Field of Classification Search ................. 375/260
See application file for complete search history.

(56) References Cited

U.S. PATENT DOCUMENTS

2002/0086707 A1   7/2002  Struhsaker et al.
2005/0249127 A1*  11/2005 Huo et al. .................... 370/252

FOREIGN PATENT DOCUMENTS

EP          1292061 A1      3/2003
WO       WO-0156239 A2     8/2001
WO     WO-2006062436 A1    6/2006

OTHER PUBLICATIONS

"Air Interface for Fixed Broadband Wireless Access Systems", *IEEE Std.* 802.16, (2004),307-631.

* cited by examiner

*Primary Examiner*—Kevin Y Kim
(74) *Attorney, Agent, or Firm*—The Law Offices of John C. Scott, LLC; John C. Scott (57) ABSTRACT

A multicarrier base station communicates with subscriber stations of different bandwidth profiles by allocating time slots in downlink and uplink frames and subcarriers of a single multicarrier communication channel to various bandwidth subchannels.

29 Claims, 7 Drawing Sheets

METHOD AND SYSTEM FOR MULTICARRIER COMMUNICATION BETWEEN A BASE STATION AND SUBSCRIBERS OF DIFFERENT BANDWIDTHS

TECHNICAL FIELD

Embodiments of the present invention pertain to multicarrier communications. Some embodiments of the present invention pertain to orthogonal frequency division multiple access (OFDMA) communications.

BACKGROUND OF THE INVENTION

Multicarrier communication systems, such as orthogonal frequency division multiple access (OFDMA) systems, use a set of symbol-modulated subcarriers to communicate information within an available spectrum. Many modern digital communication systems, including wireless metropolitan area networks (WMANs) and wireless local-area networks (WLANs), are using multicarrier signals to help signals survive in environments having multipath reflections. One problem with some of these conventional multicarrier communication systems is that some base stations operate using a fixed channel bandwidth, such as 20 MHz. This limits a base station's use to communications with subscriber stations that use the same number of subcarriers across the same bandwidth and does not permit communications with subscriber stations of different bandwidth profiles.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to voluntarily limit the scope of this application to any single invention or inventive concept if more than one is in fact disclosed.

Figure 1:
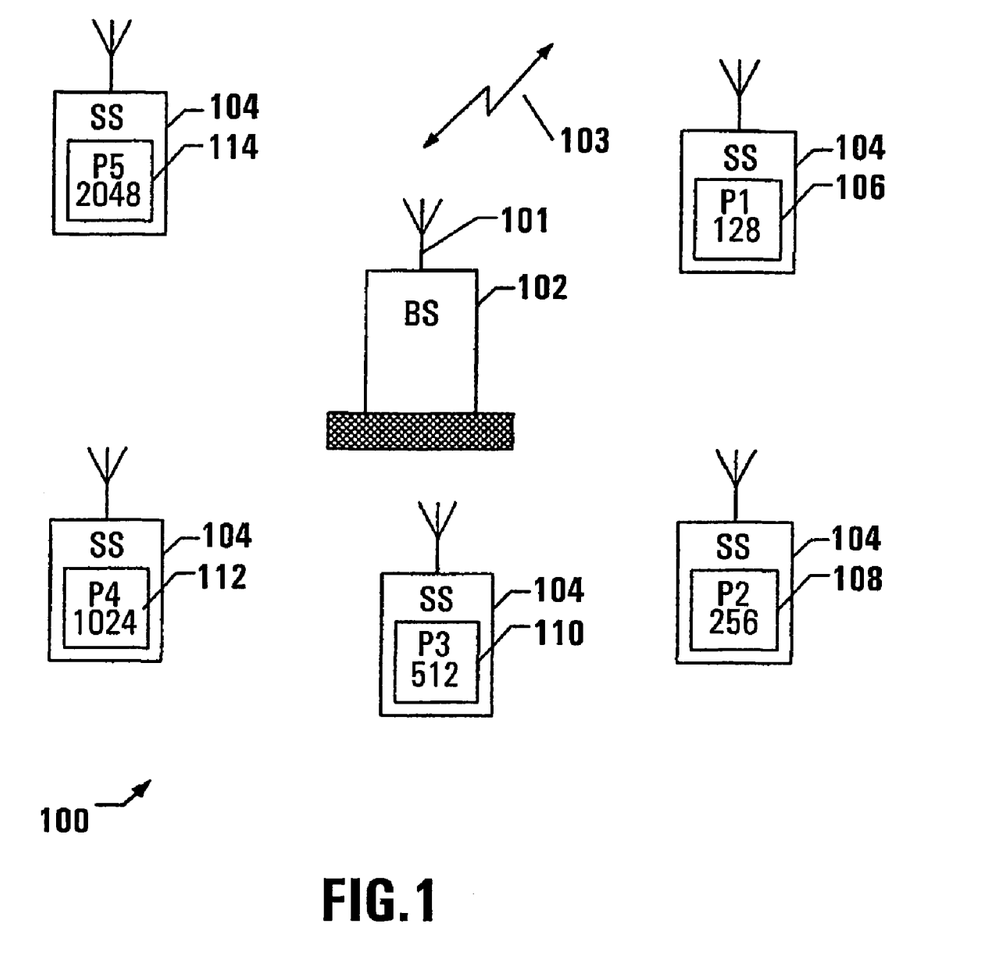
FIG. 1 illustrates a communication environment in accordance with some embodiments of the present invention.

FIG. 1 illustrates a communication environment in accordance with some embodiments of the present invention. Multicarrier base station 102 communicates multicarrier communication signals 103 with one or more subscriber stations 104 over a multicarrier communication channel. Subscriber stations 104 may have different bandwidth profiles and may be allocated varying amounts of subcarriers of a standard multicarrier communication channel based on their bandwidth profile. In some embodiments, multicarrier base station 102 may be a broadband wireless base station that communicates using orthogonal frequency division multiple access (OFDMA) communications, which may be in accordance with the IEEE 802.16 (published 2004) and/or IEEE 802.16(e) standards, although the scope of the invention is not limited in these respects. In some of these embodiments, the single multicarrier communication channel may have a 20 MHz bandwidth and the communications between subscriber stations 104 and base station 102 may be time synchronized. These embodiments are described in more detail below.

In some embodiments, base station 102 may allocate subcarriers of a single multicarrier communication channel to subscriber stations 104 based on a bandwidth profile associated with the individual subscriber station. In these embodiments, base station 102 may communicate with a full bandwidth subscriber station (i.e., subscriber station 114) using either substantially all the subcarriers or subsets of the subcarriers of the multicarrier communication channel within a frame. In these embodiments, base station 102 may also communicate over subchannels with narrower-bandwidth subscriber stations (i.e., subscriber stations 106-112) using the allocated time-slots and subcarriers within the frame.

Subscriber stations 104 may be wireless communication devices that may include personal digital assistants (PDAs), laptop or portable computers with wireless communication capability, web tablets, wireless telephones, wireless headsets, pagers, instant messaging devices, access points or other devices that may receive and/or transmit information wirelessly. In some embodiments, subscriber stations 104 and base station 102 may transmit and/or receive radio-frequency (RF) communications in accordance with specific communication standards, such as the Institute of Electrical and Electronics Engineers (IEEE) standards including the IEEE 802.16-2004 and/or IEEE 802.16(e) standards for wireless metropolitan area networks (WMANs), although subscriber stations 104 and base station 102 may also be suitable to transmit and/or receive communications in accordance with other techniques.

Base station antenna 101 may include one or more of a directional or omnidirectional antenna, including, for example, a dipole antenna, a monopole antenna, a patch antenna, a loop antenna, a microstrip antenna, a sector antenna, an advanced antenna system (AAS) or other type of antenna or antenna system suitable for reception and/or transmission of RF signals which may be processed by base station 102.

Figure 2:
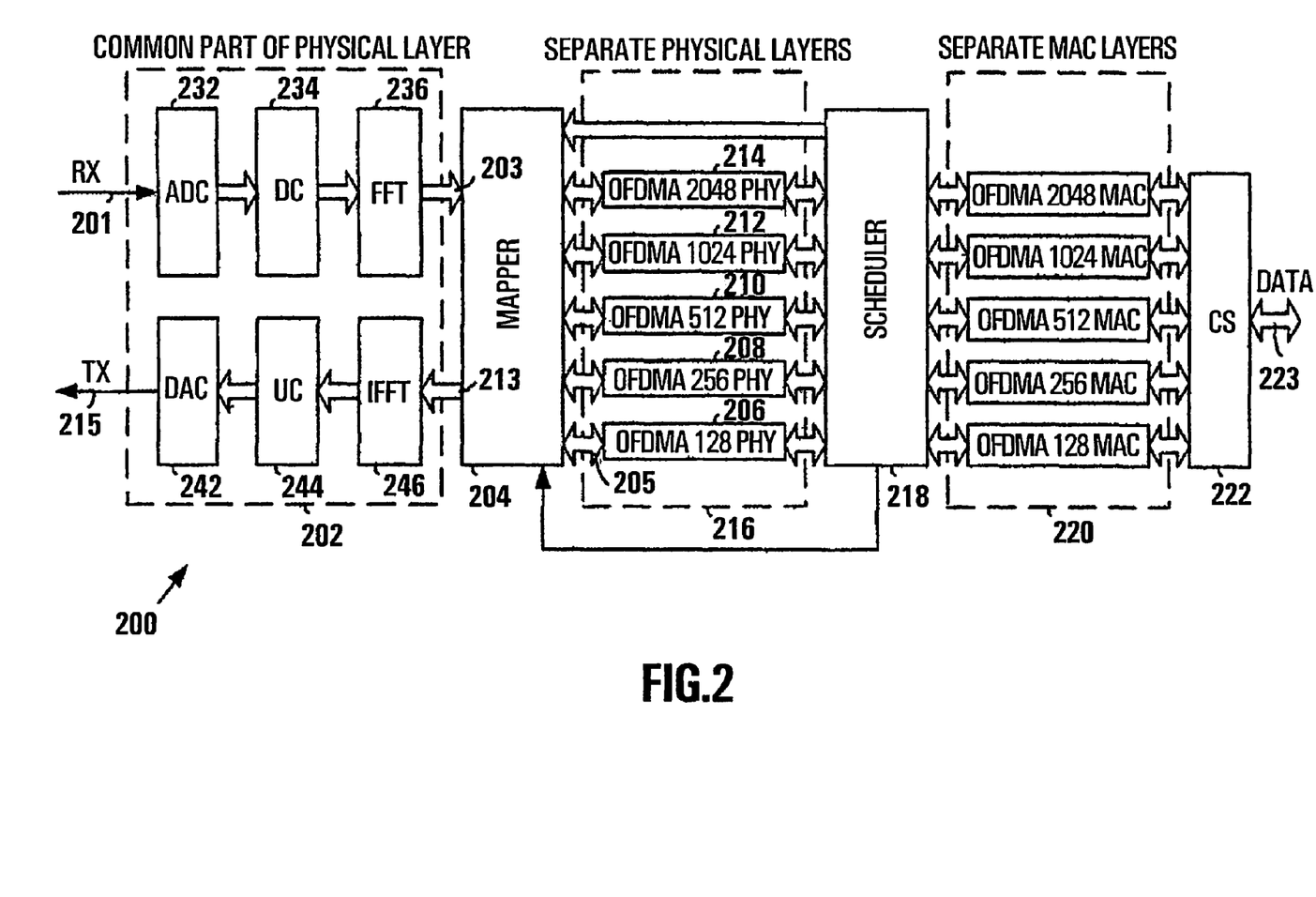
FIG. 2 is a functional block diagram of a multicarrier base station in accordance with some embodiments of the present invention.

FIG. 2 is a functional block diagram of a multicarrier base station in accordance with some embodiments of the present invention. Multicarrier base station 200 may be suitable for use as multicarrier base station 102 (FIG. 1) and may communicate multicarrier signals with subscriber stations of various bandwidth profiles as described in more detail below.

The receiver side of multicarrier base station 200 comprises front-end physical-layer circuitry 202 to receive multicarrier communication signals 201 within a single channel bandwidth and to generate frequency-domain samples 203 associated with each of the subcarriers of the multicarrier communication channel. Multicarrier base station 200 may also include mapper 204 to map frequency-domain samples 203 from groups of subcarriers to physical-layer circuitry 216. In some embodiments, physical-layer circuitry 216 may include separate functional elements associated with the various bandwidth profiles of the subscriber units.

Physical-layer circuitry 216 may generate a decoded bit stream from frequency-domain samples 205 provided by mapper 204 for each bandwidth profile. Multicarrier base station 200 may also include scheduler 218 to generate frames for each bandwidth profile and media-access-control (MAC) layers 220 to process the frames for each bandwidth profile. In some embodiments, MAC layers 220 may include separate functional elements to process bits from each bandwidth profile and to apply one of a plurality of protocols to the separated data based on the associated bandwidth profile.

Multicarrier base station 200 may also comprise convergence sublayer (CS) 222 to provide an interface with a network, such as the Internet, an Ethernet, an asynchronous transfer mode (ATM) network or other network. In some embodiments, convergence sublayer 222 may be capable of generating separate data packets of data streams for each bandwidth profile received from MAC layer 220.

In some embodiments, front-end physical-layer circuitry 202 may comprise analog-to-digital conversion (ADC) circuitry 232 and down-converter circuitry 234 to generate time-domain digital samples from the multicarrier communication signals received within the channel bandwidth. Front-end physical-layer circuitry 202 may also include Fourier transform circuitry 236 to perform a Fourier transformation on the time-domain digital samples to generate frequency-domain samples 203 associated with each of the subcarriers. In these embodiments, mapper 204 may map frequency-domain samples 203 to physical-layer circuitry 216 for separate processing of subcarriers associated with the each bandwidth profile based on information provided by scheduler 218.

The transmit side of multicarrier base station 200 may include digital-to-analog conversion (DAC) circuitry 242 and upconverter 244 to generate multicarrier RF signals 215 for transmission to subscriber stations of the various bandwidth profiles. The transmit side of multicarrier base station 200 may also include inverse Fourier transform circuitry 246 to generate time-domain samples from frequency-domain samples 213 associated with each subcarrier. Mapper 204 may combine frequency-domain samples 205 associated with subcarriers for each of the bandwidth profiles provided by physical-layer circuitry 216 associated with the different bandwidth profiles. Inverse Fourier transform circuitry 246 may perform an inverse Fourier transformation on combined frequency-domain samples 213 to generate the single multicarrier communication signal for transmission to the various bandwidth profile subscriber stations. To achieve orthogonality between closely spaced subcarriers, in some embodiments, each subcarrier of the multicarrier signal may have a null at substantially a center frequency of the other subcarriers of the multicarrier signal.

Although base station 200 is illustrated as having several separate functional elements, one or more of the functional elements may be combined and may be implemented by combinations of software-configured elements, such as processing elements including digital signal processors (DSPs), and/or other hardware elements. For example, processing elements may comprise one or more microprocessors, DSPs, application specific integrated circuits (ASICs), and combinations of various hardware and logic circuitry for performing at least the functions described herein. In some embodiments, the functional elements of base station 200 may refer to one or more processes operating on one or more processing elements.

Figure 3:
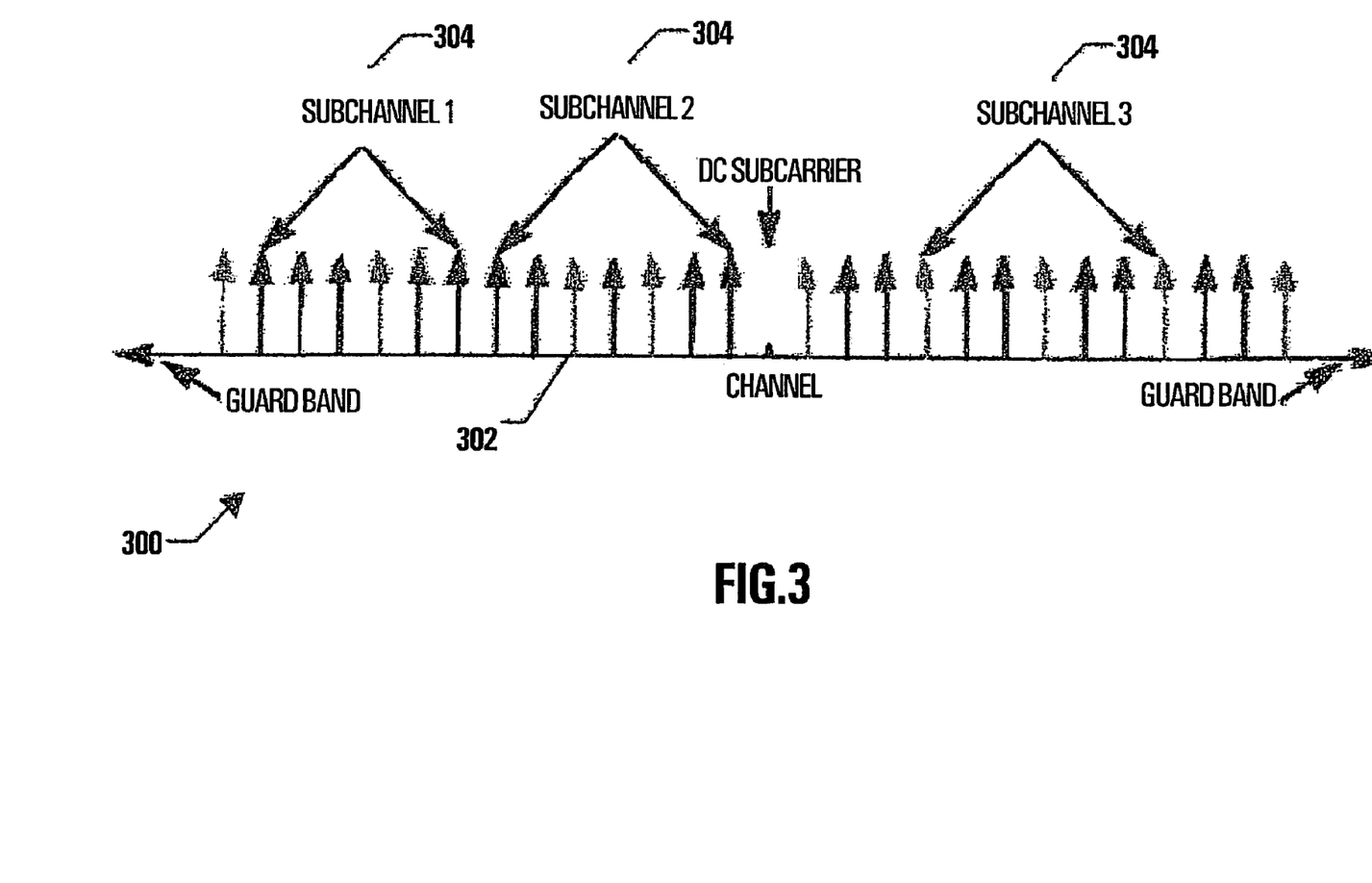
FIG. 3 illustrates an example of subcarrier allocation of a multicarrier communication channel in accordance with some embodiments of the present invention.

FIG. 3 illustrates an example of subcarrier allocation of a multicarrier communication channel in accordance with some embodiments of the present invention. Multicarrier communication channel 300 comprises a plurality of closely-spaced subcarriers 302. Each subcarrier 302 may be associated with a different frequency (e.g., tone) within the bandwidth of communication channel 300. Some subscriber stations (e.g., a full-bandwidth subscriber station) may communicate using subcarriers of substantially the entire bandwidth, while other subscriber stations (e.g., narrower-bandwidth subscriber stations) may communicate using less than the total number of subcarriers of the entire bandwidth. In these embodiments, narrower-bandwidth subscriber stations may communicate over subchannels 304 comprising less than the total number of subcarriers of communication channel 300.

Figure 4:
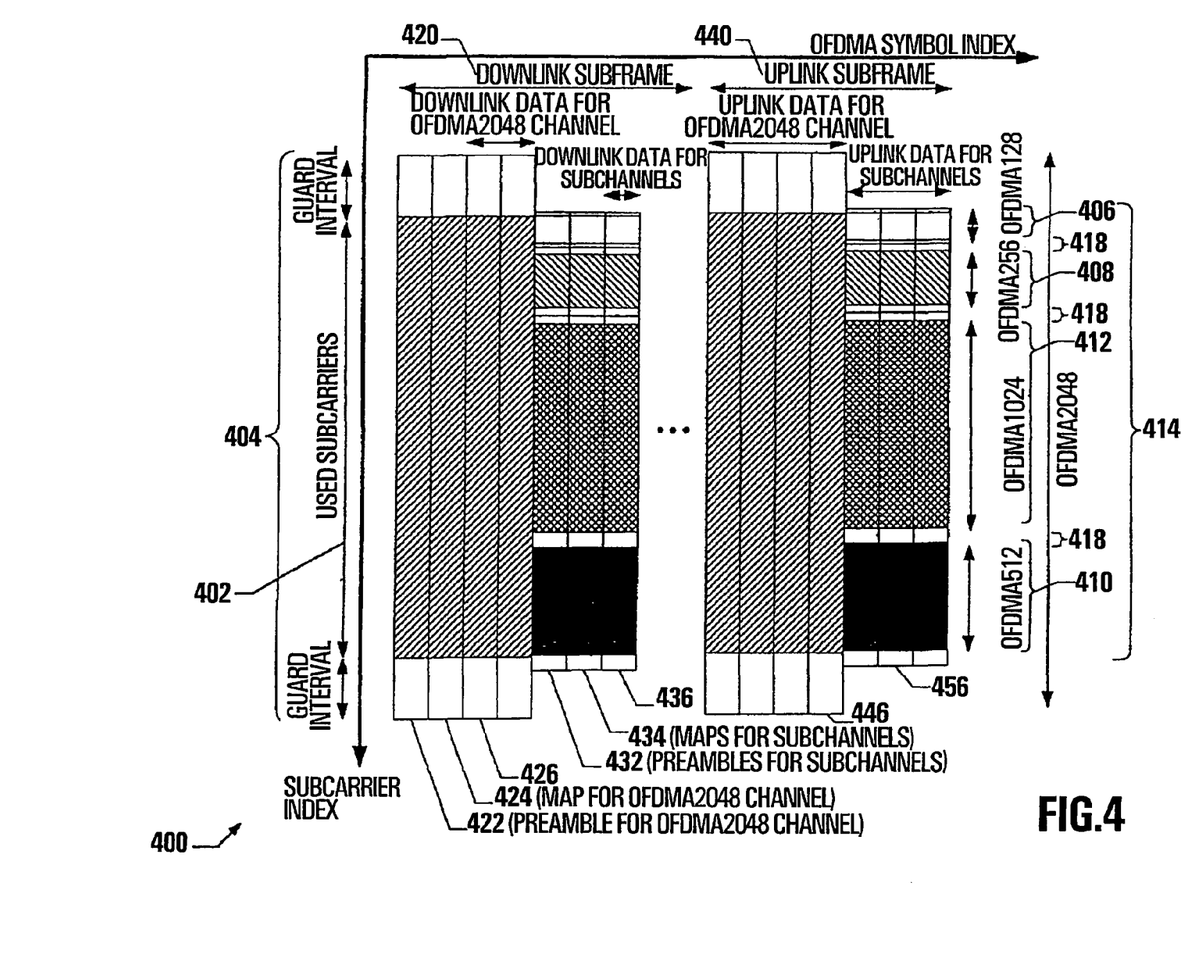
FIG. 4 illustrates a frame structure for communicating with various bandwidth profile subscriber stations in accordance with some embodiments of the present invention.

FIG. 4 illustrates a frame structure for communicating with various bandwidth profile subscriber stations in accordance with some embodiments of the present invention. Frame structure 400 includes downlink subframe 420 and uplink subframe 440 which may be transmitted on subcarriers 402 of channel bandwidth 404. Channel bandwidth 404 may correspond to channel bandwidth 300 (FIG. 3).

In some embodiments, the subchannels may comprise first subchannel 406 having approximately one-sixteenth the subcarriers of channel bandwidth 404, second subchannel 408 having approximately one-eighth the subcarriers of channel bandwidth 404, third subchannel 410 having approximately one-fourth the subcarriers of channel bandwidth 404, and fourth subchannel 412 having approximately one-half the subcarriers of channel bandwidth 404, although the scope of the invention is not limited in this respect. In some embodiments, the full channel bandwidth and the subchannels in turn may be further divided in smaller subchannels in order to achieve additional sub-channelization gain. Accordingly, some narrower-bandwidth subscriber stations, such as communication station 112 (FIG. 1), may communicate over subchannel 412 that is allocated about approximately half the subcarriers of the multicarrier communication channel. Some narrower-bandwidth subscriber stations, such as subscriber station 110 (FIG. 1), may communicate over subchannel 410 that is allocated about approximately one-fourth the subcarriers of the multicarrier communication channel. Some narrower-bandwidth subscriber stations, such as subscriber station 108 (FIG. 1) may communicate over subchannel 408 that is allocated about approximately one-eighth the subcarriers of the multicarrier communication channel. Some narrower-bandwidth subscriber stations, such as communication station 106 (FIG. 1), may communicate over subchannel 406 that is allocated about approximately one-sixteenth the subcarriers of the multicarrier communication channel. In these embodiments, some of the subcarriers may remain unused during some time slots and may provide guard intervals 418 between the subchannels. In these embodiments, full-bandwidth subscriber stations, such as subscriber station 114 (FIG. 1), may communicate over standard channel 414 that uses either most or substantially all subcarriers of the multicarrier communication channel or a substantial subset of the subcarriers.

In these embodiments, scheduler 218 (FIG. 2) may divide the single multicarrier communication channel into the plurality of subchannels based on the bandwidth profiles of the subscriber stations. Each subchannel may comprise one of a plurality of a predetermined number of orthogonal subcarriers of the multicarrier communication channel. Each of the predetermined number of subcarriers for each subchannel may be based on an associated one of the bandwidth profiles.

In some embodiments, a standard channel may refer to an OFDMA multicarrier communication channel utilizing all or substantially all subcarriers of multicarrier communication channel of a predetermined bandwidth. In some embodiments, the subchannels may comprise portions or groups of subcarriers of the standard-bandwidth channel and may have a predetermined number of subcarriers less than all of the subcarriers. In some embodiments, the predetermined bandwidth of a standard channel may be approximately 20 MHz and may be associated with a fast Fourier transformation (FFT) size of 2048, although the scope of the invention is not limited in this respect. In these embodiments, the subchannels may also comprise OFDMA multicarrier communication channels. In some embodiments, subchannel 412 may be associated with an FFT size of 1024 and may have a 10 MHz bandwidth. In some embodiments, subchannel 410 may be associated with an FFT size of 512 and may have a 5 MHz bandwidth. In some embodiments, subchannel 408 may be associated with an FFT size of 256 and may have a 2.5 MHz bandwidth. In some embodiments, subchannel 406 may be associated with an FFT size of 128 and may have a 1.25 MHz bandwidth, although the scope of the invention is not limited in this respect. Full-bandwidth subscriber stations, such as subscriber station 114 (FIG. 1), may refer to subscriber stations 104 that operate using the subcarriers of a standard channel, and narrower-bandwidth subscriber stations, such as subscriber stations 106-112 (FIG. 1) may refer to subscriber stations that operate using assigned or allocated subcarriers of one of the subchannels. Each subscriber station 104 may be associated with one of these bandwidth profiles and may communicate with different media-access control (MAC) layer protocols, although the scope of the invention is not limited in this respect.

Although FIG. 4 illustrates subchannels 406, 408, 410 and 412 within certain positions and in a particular order within the communication channel, this is not a requirement. Channel bandwidth 404 may be configured in many different ways. For example, in some embodiments, subchannel 406 and/or subchannel 408 may be allocated subcarriers (i.e., positioned) between subchannels 410 and 412.

In some embodiments, the particular subchannels may be dynamically configured depending on the bandwidth profile of the subscriber units that wish to communicate with the base station. In these embodiments, channel bandwidth 404 may be divided into many different combinations of the subchannels, such as two half-bandwidth subchannels (e.g., when there are many half-bandwidth subscriber stations), or four quarter-bandwidth subchannels, one half-bandwidth subchannel and two quarter-bandwidth subchannels, etc.

In some embodiments, timing information for downlink data time slot 426 and uplink data time slot 446 may be transmitted to full-bandwidth subscriber stations in standard channel mapping time slot 424. Timing information for downlink data time slot 436 and uplink data time slots 456 may be transmitted to narrower-bandwidth subscriber stations in subchannel mapping time slot 434. In these embodiments, standard channel mapping time slot 424 may be transmitted in an initial portion of downlink subframe 420, and subchannel mapping time slot 434 may be transmitted in a later portion of downlink subframe 420 as illustrated, although the scope of the invention is not limited in this respect.

In some embodiments, standard channel mapping time slot 424 may be transmitted using subcarriers comprising standard channel 414 (i.e., most or substantially all data subcarriers of the standard channel), and subchannel mapping time slot 434 may be divided into one or more subchannels (406-412) of standard channel 414. In these embodiments, each subchannel mapping time slot 434 may have the timing information for associated narrower-bandwidth subscriber stations.

In some embodiments, standard channel preamble 422 may be transmitted for receipt by the full-bandwidth subscriber stations prior to the transmission of standard channel mapping time slot 424. Standard channel preamble 422 may allow synchronization by a full-bandwidth subscriber station. Subchannel preambles 432 may be transmitted for receipt by the narrower-bandwidth subscriber stations prior to the transmission of subchannel mapping time slot 434. Subchannel preambles 432 may allow synchronization by the narrower-bandwidth subscriber stations. In these embodiments, subchannel preambles 432 may be transmitted on associated subchannels (406-412) of standard channel 414. Narrower-bandwidth subscriber stations may listen for preambles associated with their bandwidth profile and according can easily identify the proper subchannel that they will be using.

Downlink data may be transmitted to the full-bandwidth subscriber stations in standard data time slots 426, and downlink data may be transmitted to the narrower-bandwidth subscriber stations in subchannel data time slots 436. Downlink data may be transmitted to the narrower-bandwidth subscriber stations on associated subchannels (i.e., subchannels 406-412) of standard channel 414. In some embodiments, the full-bandwidth subscriber stations and the narrower-bandwidth subscriber stations may know when to receive their downlink data based on the timing information received in mapping time slots 424 and 434.

In some embodiments, uplink data from full-bandwidth subscriber stations may be received at base station 102 (FIG. 1) during standard uplink data time slots 446, and uplink data from narrower-bandwidth subscriber stations may be received at the base station during subchannel uplink data time slots 456. In these embodiments, the narrower-bandwidth subscriber stations may be synchronized to provide their uplink data to the base station substantially simultaneously. In these embodiments, each narrower-band subscriber station may transmit uplink data on its assigned subchannel during times defined by mapping information transmitted in mapping time slot 434.

In some embodiments, mapping time slot 424 includes a list of references to the time slots allocated to the full-bandwidth subscriber stations, and each subchannel of mapping time slot 434 may include a list of references to the time slots allocated to narrower-bandwidth subscriber stations associated with the particular subchannel. From the point of view of a narrower-bandwidth subscriber station, the narrower-bandwidth subscriber stations may not even realize they are communicating with a full bandwidth base station because the base station may use the narrower-bandwidth subscriber station's protocol in the narrower-bandwidth subscriber station's time slots. Narrower-bandwidth subscriber stations may also not realize that other bandwidth profile subscriber stations are communicating with the base station because a narrower-bandwidth subscriber station generally processes only the information received within its allocated subchannel. Accordingly, interoperability between a fill bandwidth base station and subscriber stations of various bandwidth profiles, including full bandwidth profiles, is provided. Wireless providers may not need separate base stations for supporting subscriber stations of various bandwidth profiles.

Figure 5:
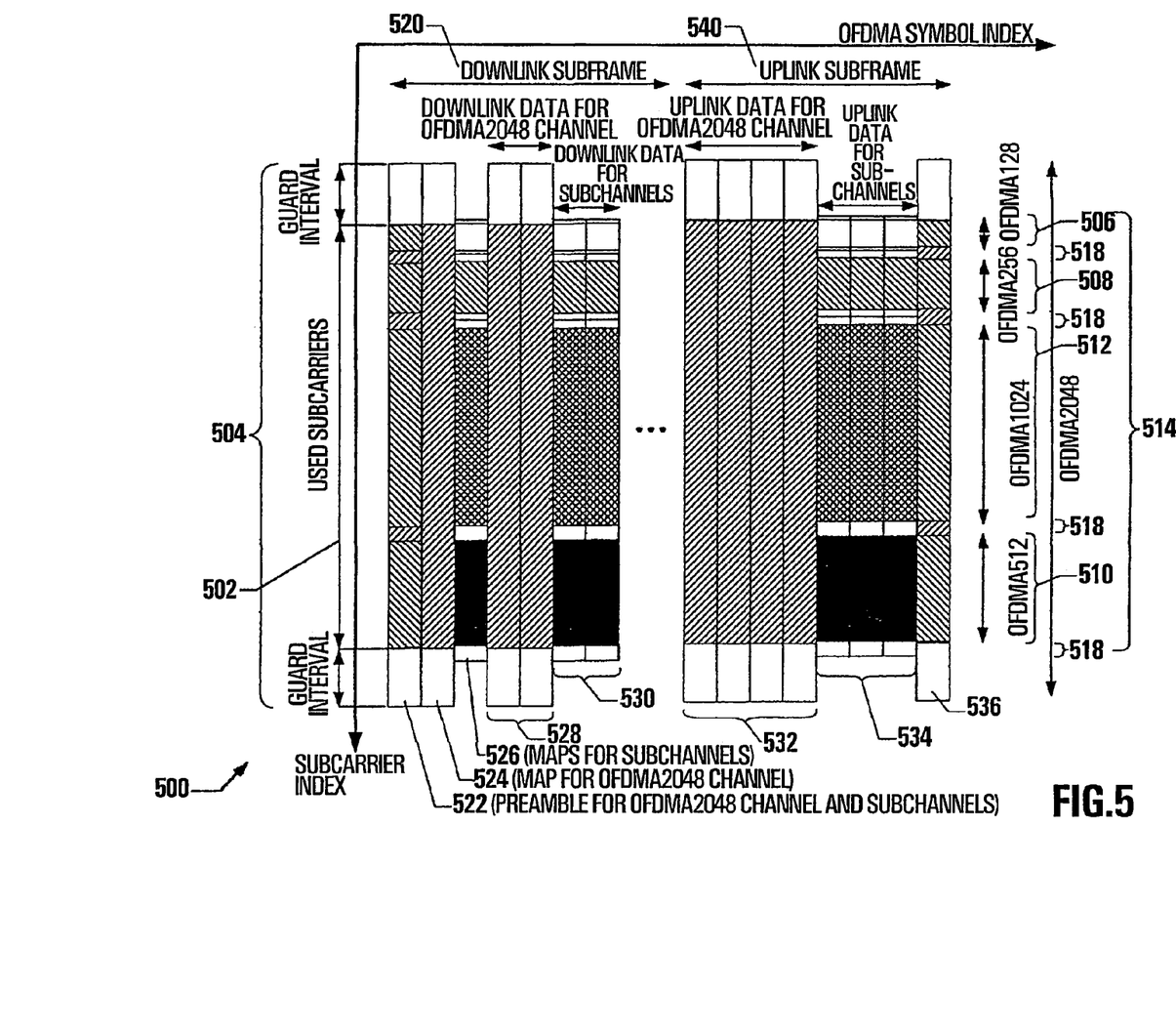
FIG. 5 illustrates an exemplary frame structure that may be used by a heterogeneous base station for communicating with various bandwidth profile subscriber stations in accordance with an embodiment of the present invention.

FIG. 5 illustrates an exemplary frame structure 500 that may be used by a heterogeneous base station for communicating with various bandwidth profile subscriber stations in accordance with an embodiment of the present invention. As with the frame structure 400 of FIG. 4, the frame structure 500 includes a downlink subframe 520 and uplink subframe 540 which may be transmitted on subcarriers 502 of channel bandwidth 504. The downlink subframe 520 may include downlink data time slots 528 that are allocated to specific full channel subscriber stations associated with the base station for use in transmitting user data from the base station to the subscriber stations. The downlink subframe 520 may also include downlink data time slots 530 that are allocated to specific subchannel subscriber stations associated with the base station for use in transmitting user data from the base station to the subscriber stations. Likewise, the uplink subframe 540 may include uplink data time slots 532 that are allocated to specific full channel subscriber stations associated with the base station for use in transmitting user data from the subscriber stations to the base station. The uplink subframe 540 may also include uplink data time slots 534 that are allocated to specific subchannel subscriber stations associated with the base station for use in transmitting user data from the subscriber stations to the base station.

As described previously, the downlink data time slots 530 and the uplink data time slots 534 that are allocated to subchannel subscriber stations will typically be divided into subchannels that may be individually allocated to subscriber stations. For example, in the frame structure 500 of FIG. 5, the downlink data time slots 530 and the uplink data time slots 534 may be divided into a first subchannel 506, a second subchannel 508, a third subchannel 510, and a fourth subchannel 512. The first subchannel 506 may include approximately one-sixteenth of the subcarriers of channel bandwidth 504, the second subchannel 508 may include approximately one-eighth of the subcarriers of channel bandwidth 504, the third subchannel 510 may include approximately one-fourth of the subcarriers, and the fourth subchannel 512 may include approximately one-half of the subcarriers. Guard intervals 518 may be provided between the subchannels. In at least one embodiment, the number, size, and/or location of the subchannels may vary during base station operation.

The frame structure 500 of FIG. 5 includes a single preamble time slot 522 that may be used by subscriber stations to synchronize to the base station. The single preamble time slot 522 may be used by both full channel subscriber stations and subchannel subscriber stations associated with the base station. This represents a savings in overhead from the frame structure 400 of FIG. 4 which includes two separate preamble time slots (i.e., preamble time slot 422 for full channel subscriber stations and preamble time slot 432 for subchannel subscriber stations). A full channel subscriber station may read and utilize the entire preamble time slot 522 to perform synchronization. A subchannel subscriber station, on the other hand, may utilize only the portion of the preamble time slot 522 that corresponds to an associated subchannel. The preamble time slot 522 will typically include a code sequence that may be used to provide synchronization. For a given base station, the code sequence will typically be the same from frame to frame. In at least one embodiment, however, different base stations may use different code sequences in the preamble time slot 522. In this manner, the preambles may be used by subscriber stations to distinguish between base stations in addition to providing synchronization. In one approach, heterogeneous base stations will use different code sequences within corresponding preamble time slots than non-heterogeneous base stations. This will allow a subscriber station to determine the type of base station that transmitted a frame received by the subscriber station by reading the preamble of the received frame.

The frame structure 500 of FIG. 5 includes a full channel mapping time slot 524, for use by full channel subscriber stations, after the preamble time slot 522. The full channel mapping time slot 524 may include information that describes some or all of the frame structure 500 for the full channel subscriber stations. This may include, for example, data time slot allocations for full channel subscriber stations (uplink and downlink), modulation and coding schemes used by full channel subscriber stations, and/or other information. A full channel subscriber station may read the full channel mapping time slot 524 to determine which time slot(s), if any, is(are) allocated to the subscriber station to receive data from the base station (i.e., downlink time slot(s)) and which time slot(s), if any, is(are) allocated to the subscriber station to transmit data to the base station (i.e., uplink time slot(s)).

After the full channel mapping time slot 524, the frame structure 500 of FIG. 5 may include a subchannel mapping time slot 526 for use by subchannel subscriber stations. The subchannel mapping time slot 526 may include information that describes some or all of the frame structure 500 for the subchannel subscriber stations. As shown, the subchannel mapping time slot 526 may be divided into subchannels 506, 508, 510, 512 as described previously. Each subchannel 506, 508, 510, 512 within the subchannel mapping time slot 526 may include mapping information that relates to the subscriber(s) that use that subchannel. This may include, for example, data time slot allocations (uplink and downlink), modulation and coding schemes, and/or other information. In some embodiments of the invention, the positions of the full channel mapping time slot 524 and the subchannel mapping time slot 526 are reversed. Other positions within the frame structure may alternatively be used as long as the positions do not change from frame to frame and are known by the subscriber stations.

In at least one embodiment of the invention, the full channel and subchannel mapping information is merged into a single mapping time slot. In such a system, full channel subscriber stations may be required to read and decode the information within one or more of the subchannels of the single mapping time slot to obtain the mapping information. In scenarios where there are no subchannel subscriber stations currently using a heterogeneous base station, full channel coding can be used for the single mapping time slot.

Referring again to FIG. 5, the frame structure 500 may also include a ranging time slot 536 that may be used by subscriber stations to request the allotment of one or more data time slots from the base station. The ranging time slot may be used by, for example, new subscriber stations trying to enter a network and established subscriber stations trying to modify (e.g., increase) the number of time slots already allocated to them (e.g., contention bandwidth requests, etc.). Unlike the preamble time slot and the mapping time slots discussed above, the ranging time slot may not be present within every frame. That is, it may be determined that a ranging time slot is only necessary every so often. In at least one embodiment, the frequency of occurrence of the ranging time slot within the frame structure may change with time based on factors such as, for example, current traffic levels, number of associated subscriber stations, etc. As shown in FIG. 5, only a single ranging time slot 536 is included in the frame structure 500. This single ranging time slot 536 is to be used by both full channel subscriber stations and subchannel subscriber stations. To prevent collisions within the single ranging time slot 536, in one approach, code division multiple access (CDMA) techniques are used by the subscriber stations to encode their respective requests. That is, each subscriber may use a different orthogonal code to spread spectrum modulate a corresponding request to be transmitted to the base station. The base station may then decode the CDMA requests with minimal interference from the transmissions of other subscriber stations. Other techniques for providing multiple access within the single ranging time slot may alternatively be used. In other embodiments, multiple ranging time slots may be provided within a frame.

Figure 6:
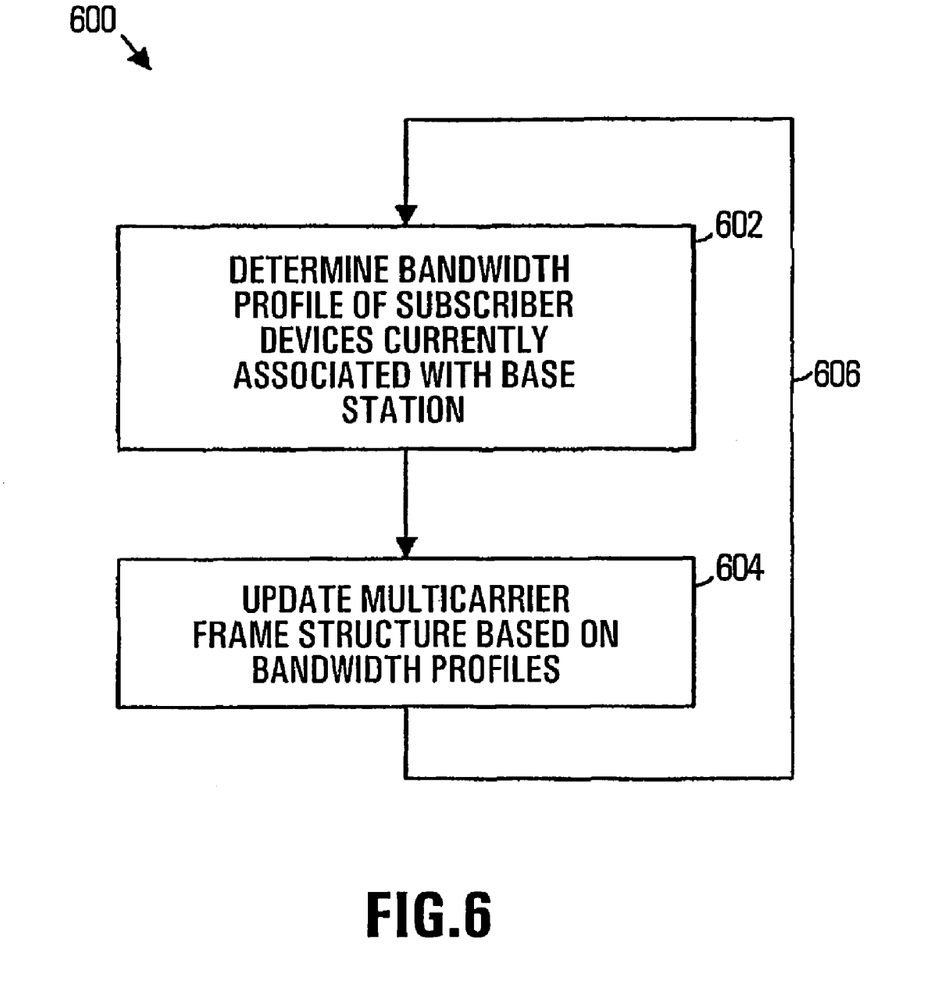
FIG. 6 is a flowchart illustrating an exemplary method for use in connection with a heterogeneous multicarrier base station in accordance with an embodiment of the present invention.

FIG. 6 is a flowchart illustrating an exemplary method 600 for use in connection with a heterogeneous multicarrier base station in accordance with an embodiment of the present invention. The method 600 may be practiced within, for example, the scheduler 218 of the base station 200 of FIG. 2. First, bandwidth profiles are acquired for subscriber stations that are associated with the base station (block 602). These bandwidth profiles are indicative of an operational bandwidth of the various subscriber stations. The bandwidth profiles may be determined during, for example, a network entry procedure followed by the subscriber stations. This procedure is typically initiated when a subscriber station transmits a ranging request to the base station in a ranging time slot. As described above, in at least one embodiment of the invention, CDMA techniques are used by the subscriber stations to prevent collisions within the ranging time slot. In one approach, different CDMA codes may be used by different subscriber stations. The base station can then determine the bandwidth profile of the subscriber stations based on the codes used. A list may then be maintained in memory within the base station. Other techniques for determining the bandwidth profiles may alternatively be used.

After the bandwidth profiles have been determined, a multicarrier frame structure used by the base station may be updated based on the bandwidth profiles (block 604). For example, in one possible scenario, a base station may determine that there are four full channel subscriber stations and two half channel subscriber stations currently associated with the base station. The base station (e.g., the scheduler) may then generate an updated frame structure that includes downlink data time slot allocations and uplink data time slot allocations for the six subscriber stations. In addition to the bandwidth profiles of subscriber stations, other factors may also be taken into consideration when updating the frame structure. For example, channel load, predetermined subscriber station priorities, and/or other factors maybe considered. The base station may decide, for example, to assign multiple downlink data time slots to one full channel subscriber station and no downlink data time slots to another full channel station.

As shown in FIG. 6, the method 600 may repeat over and over again 606 during base station operation. As described above, in at least one embodiment, the multicarrier frame structure may be updated on a frame to frame basis (although actual changes to the frame structure may not occur in every successive frame). If the frame structure 500 of FIG. 5 is used as a model for the method 600, then each successive updated frame structure will have a single preamble time slot and two mapping time slots. The number of fill channel downlink data time slots, subchannel downlink data time slots, full channel uplink data time slots, and subchannel uplink data time slots, on the other hand, may change from frame to frame. A single ranging time slot may be included in the frame structure from time to time. Similarly, if the frame structure 400 of FIG. 4 is used as a model for the method 600, then each successive updated frame structure will have two preamble time slots and two mapping time slots and the number of full channel downlink data time slots, subchannel downlink data time slots, full channel uplink data time slots, and subchannel uplink data time slots may change from frame to frame.

Figure 7:
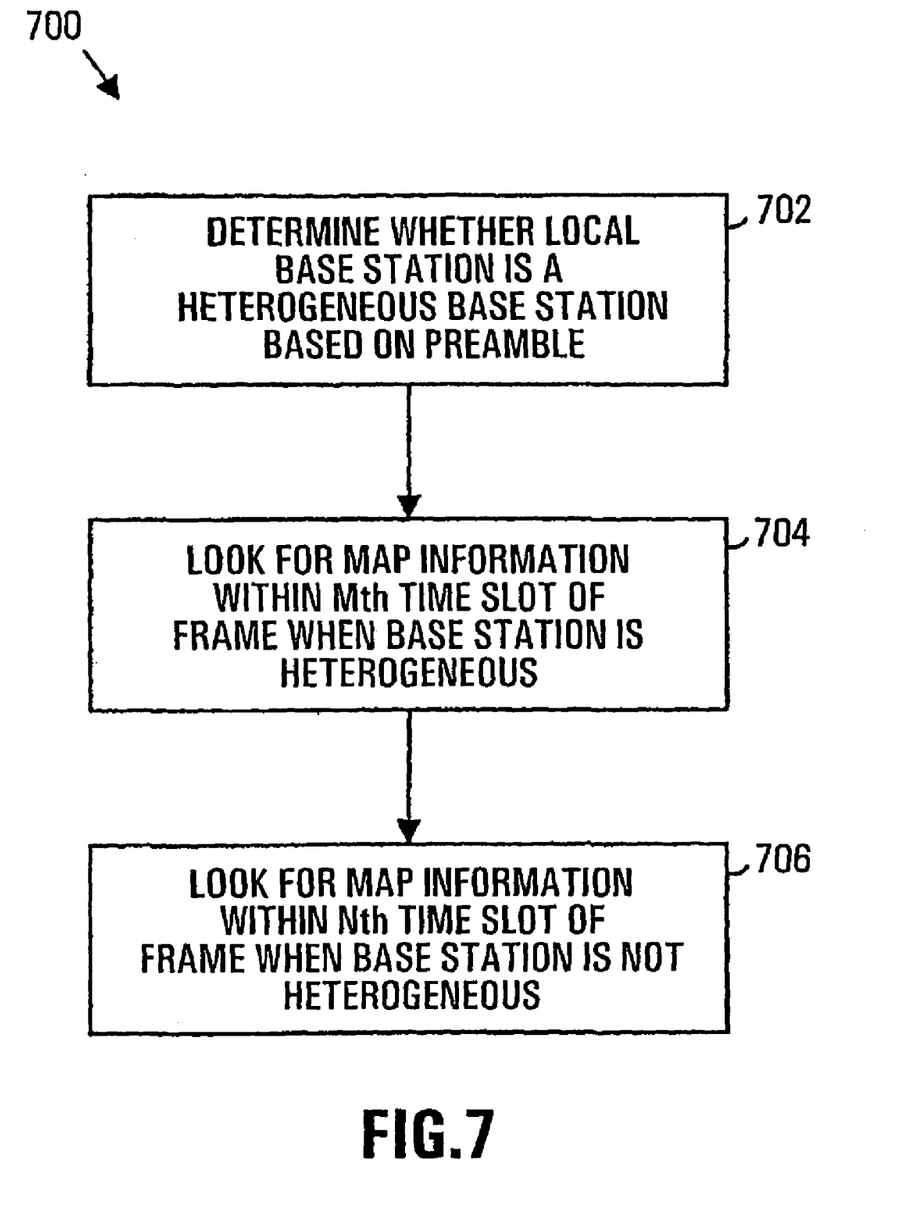
FIG. 7 is a flowchart illustrating an exemplary method for use by subscriber stations to access both heterogeneous base stations and non-heterogeneous base stations in accordance with an embodiment of the present invention.

A heterogeneous base station in accordance with the present invention may require changes to be made to subscriber devices that will communicate through the base station. For example, if the frame structure 500 of FIG. 5 is used by a base station, then full channel subscriber devices will need to know that the full channel mapping information is located in the first time slot after the preamble time slot and subchannel subscriber devices will need to know that the subchannel mapping information is located in the second time slot after the preamble time slot. If these same subscriber devices operate with a non-heterogeneous base station (e.g., a base station designed to operate with a single type of device), then the corresponding mapping information may be in a different location within the frame. FIG. 7 is a flowchart illustrating an exemplary method 700 that may be used to overcome this problem in accordance with an embodiment of the present invention. The method 700 may be performed by one of the multicarrier subscriber stations 104 of FIG. 1 or in other multicarrier systems, components, or devices. First, it is determined whether a base station servicing a subscriber station is a heterogeneous base station (block 702). In at least one approach, this may be achieved by examining the preamble of a frame transmitted by the base station. As described previously, in at least one embodiment, heterogeneous base stations will use different code sequences within corresponding preamble time slots of a frame than non-heterogeneous base stations. If the subscriber station detects the appropriate code sequence, it knows that the base station is heterogeneous. Other techniques for determining whether the base station is heterogeneous may alternatively be used.

When the base station is determined to be a heterogeneous base station, the subscriber station will look for the corresponding mapping information within the Mth time slot of the frame (block 704). The Mth time slot of the frame is the time slot where mapping information is located for a subscriber station having this bandwidth profile when a heterogeneous base station has transmitted the frame. When the base station is determined to be a non-heterogeneous base station, the subscriber station will look for the corresponding mapping information within the Nth time slot of the frame (block 706). The Nth time slot of the frame is the time slot where mapping information is located for a subscriber station having this bandwidth profile when a non-heterogeneous base station has transmitted the frame. N and M are not equal for subchannel subscribers while they may be equal for fullchannel subscribers.

In the embodiments described above, the term "multicarrier" has been used often to describe the type of wireless communication being used. It should be appreciated that any of the disclosed embodiments and their variants may be practiced in a system using the orthogonal frequency division multiplexing (OFDM) or orthogonal frequency division multiple access (OFDMA) forms of multicarrier communication.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices.

Embodiments of the invention may be implemented in one or a combination of hardware, firmware, and software. Embodiments of the invention may also be implemented as instructions stored on a machine-readable medium, which may be read and executed by at least one processor to perform the operations described herein. A machine-readable medium may include any mechanism for storing information in a form readable by a machine (e.g., a computer). For example, a machine-readable medium may include read-only memory (ROM), random-access memory (RAM), magnetic disk storage media, optical storage media, flash-memory devices, and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. An apparatus for use in a base station in a multicarrier wireless communication system, said apparatus comprising:
   a scheduler to determine bandwidth profiles of multicarrier subscriber stations associated with the base station and to generate an updated multicarrier frame structure for use by the base station to communicate with said multicarrier subscriber stations based on said bandwidth profiles, said bandwidth profiles being indicative of operating bandwidths of corresponding multicarrier subscriber stations, said updated multicarrier frame structure to include a plurality of time slots that each have a predetermined number of subcarriers distributed across a full channel bandwidth, wherein each multicarrier subscriber station can be one of: a full channel subscriber station and a subchannel subscriber station;
   wherein said scheduler is to determine a number of full-channel downlink data time slots, a number of subchannel downlink data time slots, a number of full-channel uplink data time slots, and a number of subchannel uplink data time slots to include in said updated multicarrier frame structure based on one or more factors, said one or more factors including said bandwidth profiles of said multicarrier subscriber stations associated with the base station.

2. The apparatus of claim 1, wherein:
said scheduler is to generate an updated multicarrier frame structure on a frame-by-frame basis during operation of the base station.

3. The apparatus of claim 1, wherein:
said scheduler is to include a single preamble time slot in said updated multicarrier frame structure for use by multicarrier subscriber stations to synchronize to the base station, said single preamble time slot for use by full channel subscriber stations and subchannel subscriber stations.

4. The apparatus of claim 1, wherein:
said scheduler is to include one preamble time slot in said updated multicarrier frame structure for use by full channel subscriber stations to synchronize to the base station and another preamble time slot in said updated multicarrier frame structure for use by subchannel subscriber stations to synchronize to the base station.

5. The apparatus of claim 1, wherein:
said scheduler is to include a maximum of one ranging time slot in said updated multicarrier frame structure for use by multicarrier subscriber stations to request assignment of one or more data time slots, said one ranging time slot for use by full channel subscriber stations and subchannel subscriber stations.

6. The apparatus of claim 5, wherein:
subscriber stations use code division multiple access (CDMA) techniques to transmit during said one ranging time slot, each subscriber station having a unique CDMA code, said apparatus including CDMA decoding functionality for decoding information transmitted within said one ranging time slot.

7. The apparatus of claim 1, wherein:
said scheduler is to include one mapping time slot in said updated multicarrier frame structure for use by both full channel subscriber stations and subchannel subscriber stations, said one mapping time slot to include information that is descriptive of said updated multicarrier frame structure.

8. The apparatus of claim 1, wherein:
said scheduler is to include one mapping time slot in said updated multicarrier frame structure for use by full channel subscriber stations and another mapping time slot in said updated multicarrier frame structure for use by subchannel subscriber stations, said mapping time slots to include information that is descriptive of said updated multicarrier frame structure.

9. The apparatus of claim 1, wherein:
said one or more factors further includes at least one of: channel load and subscriber station priorities.

10. The apparatus of claim 1, wherein:
said apparatus is for use in an orthogonal frequency division multiplexing based wireless communication system.

11. A method comprising:
determining bandwidth profiles of multicarrier subscriber stations associated with a multicarrier base station, said bandwidth profiles being indicative of operating bandwidths of corresponding multicarrier subscriber stations; and
updating a multicarrier frame structure used to support communication between said base station and said multicarrier subscriber stations based on said bandwidth profiles to generate an updated multicarrier frame structure, said updated multicarrier frame structure including a plurality of time slots that each have a predetermined number of subcarriers distributed across a full channel bandwidth, wherein each multicarrier subscriber station can be one of: a full channel subscriber station and a subchannel subscriber station;

wherein said undated multicarrier frame structure includes one mapping time slot for use by full channel subscriber stations and another mapping time slot for use by subchannel subscriber stations, each of said mapping time slots to include information that is descriptive of said updated multicarrier frame structure.

12. The method of claim 11, further comprising:
repeating updating on a frame by frame basis during operation of said base station.

13. The method of claim 11, wherein:
said updated multicarrier frame structure includes one preamble time slot for use by multicarrier subscriber stations to synchronize to said base station, said one preamble time slot for use by full channel subscriber stations and subchannel subscriber stations.

14. The method of claim 11, wherein:
said updated multicarrier frame structure includes one preamble time slot for use by full channel subscriber stations to synchronize to said base station and another preamble time slot for use by subchannel subscriber stations to synchronize to said base station.

15. The method of claim 11, wherein:
said updated multicarrier frame structure includes a maximum of one ranging time slot for use by multicarrier subscriber stations to request assignment of one or more data time slots, said one ranging time slot for use by full channel subscriber stations and subchannel subscriber stations.

16. The method of claim 15, wherein:
said multicarrier subscriber stations use code division multiple access (CDMA) techniques to transmit during said one ranging time slot, each subscriber station having a unique CDMA code.

17. The method of claim 11, wherein:
said updated multicarrier frame structure includes a number of full-channel downlink data time slots, a number of sub-channel downlink data time slots, a number of full-channel unlink data time slots, and a number of sub-channel uplink data time slots.

18. A computer implemented method comprising:
determining whether a multicarrier base station is a heterogeneous base station that is capable of servicing multicarrier subscriber stations having different bandwidth profiles, based on a frame received from said multicarrier base station;
looking for mapping information within an Mth time slot of said frame when said base station is a heterogeneous base station; and
looking for mapping information within an Nth time slot of said frame when said base station is not a heterogeneous base station, wherein M and N are positive, unequal integers;
wherein said mapping information is descriptive of a present frame structure associated with said base station.

19. The method of claim 18, wherein:
determining includes determining whether said base station is a heterogeneous base station based on a preamble within said frame received from said base station.

20. The method of claim 18, wherein:
said mapping information includes time slot allocations to multicarrier subscriber stations associated with said base station.

21. The method of claim 18, wherein:
said mapping information includes an indication of modulation/coding schemes associated with multicarrier subscriber stations.

22. A system comprising:
at least one dipole antenna to provide a transition between said system and a wireless channel; and
an apparatus, in communication with said at least one dipole antenna, comprising a scheduler to determine bandwidth profiles of multicarrier subscriber stations associated with the base station and to generate an updated multicarrier frame structure for use by the base station to communicate with said multicarrier subscriber stations based on said bandwidth profiles, said bandwidth profiles being indicative of operating bandwidths of corresponding multicarrier subscriber stations, said updated multicarrier frame structure to include a plurality of time slots that each have a predetermined number of subcarriers distributed across a full channel bandwidth, wherein each multicarrier subscriber station can be one of: a full channel subscriber station and a subchannel subscriber station;
wherein said scheduler is to include a single preamble time slot in said updated multicarrier frame structure for use by multicarrier subscriber stations to synchronize to the base station, said single preamble time slot for use by full channel subscriber stations and subchannel subscriber stations.

23. The system of claim 22, wherein:
said scheduler is to include a maximum of one ranging time slot in said updated multicarrier frame structure for use by multicarrier subscriber stations to request assignment of one or more data time slots, said one ranging time slot for use by full channel subscriber stations and subchannel subscriber stations.

24. An article comprising a computer readable storage medium having instructions stored thereon that, when executed by a computing platform, operate to:
determine bandwidth profiles of multicarrier subscriber stations associated with a multicarrier base station, said bandwidth profiles being indicative of operating bandwidths of corresponding multicarrier subscriber stations; and
update a multicarrier frame structure used to support communication between said multicarrier base station and said multicarrier subscriber stations based on said bandwidth profiles to generate an updated multicarrier frame structure, said updated multicarrier frame structure to include a plurality of time slots that each have a predetermined number of subcarriers distributed across a full channel bandwidth, wherein each multicarrier subscriber station can be one of: a full channel subscriber station and a subchannel subscriber station;
wherein said updated multicarrier frame structure is to include a maximum of one ranging time slot for use by multicarrier subscriber stations to request assignment of one or more data time slots, said one ranging time slot for use by full channel subscriber stations and subchannel subscriber stations.

25. The article of claim 24, wherein:
said updated multicarrier frame structure is to include one preamble time slot for use by multicarrier subscriber stations to synchronize to said multicarrier base station, said one preamble time slot for use by full channel subscriber stations and subchannel subscriber stations.

26. The article of claim 24, wherein:
said multicarrier subscriber stations use code division multiple access (CDMA) techniques to transmit during said one ranging time slot, each subscriber station having a unique CDMA code.

27. The system of claim 23, wherein:
subscriber stations use code division multiple access (CDMA) techniques to transmit during said one ranging time slot, each subscriber station having a unique CDMA code, said apparatus including CDMA decoding functionality for decoding information transmitted within said one ranging time slot.

28. The system of claim 22, wherein:
said scheduler is to determine a number of full-channel downlink data time slots, a number of sub-channel downlink data time slots, a number of full-channel uplink data time slots, and a number of sub-channel uplink data time slots to include in said updated multicarrier frame structure based on one or more factors, said one or more factors including said bandwidth profiles of said multicarrier subscriber stations associated with the base station.

29. The system of claim 22, wherein:
said scheduler is to include one mapping time slot in said updated multicarrier frame structure for use by both full channel subscriber stations and subchannel subscriber stations, said one mapping time slot to include information that is descriptive of said updated multicarrier frame structure.

* * * * *

UNITED STATES PATENT AND TRADEMARK OFFICE
CERTIFICATE OF CORRECTION

PATENT NO. : 7,613,242 B2
APPLICATION NO. : 10/572125
DATED : November 3, 2009
INVENTOR(S) : Vladimir Bykovnikov It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 886 days.

Signed and Sealed this

Nineteenth Day of October, 2010

David J. Kappos
*Director of the United States Patent and Trademark Office*